(12) United States Patent
Liang et al.

(10) Patent No.: US 9,959,741 B2
(45) Date of Patent: May 1, 2018

(54) METHOD OF LOCATING PERIPHERAL DEVICE, COMPUTER PROGRAM PRODUCT AND ELECTRONIC DEVICE THEREOF

(71) Applicant: Wistron Corporation, New Taipei (TW)

(72) Inventors: Chen-Yi Liang, New Taipei (TW); Jui-Hung Sun, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days. days.

(21) Appl. No.: 15/196,977

(22) Filed: Jun. 29, 2016

(65) Prior Publication Data
US 2017/0256154 A1 Sep. 7, 2017

(30) Foreign Application Priority Data

Mar. 4, 2016 (TW) .............................. 105106657 A

(51) Int. Cl.
| | |
|---|---|
| *G08B 1/08* | (2006.01) |
| *G08B 21/24* | (2006.01) |
| *G06F 13/40* | (2006.01) |
| *H04L 29/06* | (2006.01) |
| *H04W 4/02* | (2018.01) |
| *H04W 12/10* | (2009.01) |
| *G08B 21/02* | (2006.01) |

(52) U.S. Cl.
CPC ......... *G08B 21/24* (2013.01); *G06F 13/4068* (2013.01); *H04L 63/107* (2013.01); *H04W 4/023* (2013.01); *H04W 12/10* (2013.01); *G08B 21/0269* (2013.01)

(58) Field of Classification Search
CPC ... G08B 21/24; G06F 13/4068; H04L 63/107; H04W 4/1023; H04W 12/10
USPC ...................................................... 340/539.32
See application file for complete search history.

(56) References Cited

U.S. PATENT DOCUMENTS

| | | | |
|---|---|---|---|
| 2010/0169473 A1 | 7/2010 | Tsuruzono | |
| 2010/0250794 A1* | 9/2010 | Hanks ................... | G06F 1/3265 710/33 |
| 2011/0291886 A1 | 12/2011 | Krieter | |
| 2012/0231434 A1* | 9/2012 | Standage ................. | G09B 5/06 434/350 |
| 2014/0118930 A1* | 5/2014 | Sedon ................ | E05B 73/0082 361/679.56 |

* cited by examiner

*Primary Examiner* — Kerri McNally
(74) *Attorney, Agent, or Firm* — Muncy, Geissler, Olds & Lowe, P.C.

(57) ABSTRACT

A method of locating peripheral device applied to an electronic device is disclosed. The electronic device is connected or electrically connected to a peripheral device. The method includes: obtaining a first location information via a locating unit; when the first connecting unit is connected to the second connecting unit, sending the first location information to the peripheral device; after the first connecting unit and the second connecting unit are separated, obtaining the first location information sent by the second transmitter via the first transmitter; obtaining a second location information via the locating unit; comparing the first location information and the second location information to determine the relative position of the electronic device and the peripheral device.

19 Claims, 13 Drawing Sheets

METHOD OF LOCATING PERIPHERAL DEVICE, COMPUTER PROGRAM PRODUCT AND ELECTRONIC DEVICE THEREOF

BACKGROUND OF THE INVENTION

1. Field of the Invention

The present invention relates to a method of locating peripheral device; more particularly, the present invention relates to a method applied to an electronic device to locate a peripheral device which is paired with the electronic device.

2. Description of the Related Art

As technology develops, computers are designed to be thin and include multiple functions, as in the case of the tablet computer or the separable notebook computer. The common tablet computer includes a display system, and the display system has a virtual keyboard for the user to use to input words. However, most users are still accustomed to using a physical keyboard to enter words. Therefore, tablet computer developers also provide an external keyboard which can be connected to the tablet computer to match the typing habits of the user and increase the convenience of the tablet computer. The display system and the keyboard of the common separable notebook computer are designed to be detachable; the user can combine the display system and the keyboard according to need to use the separable notebook computer as a normal notebook computer, or the user can separate the display system and the keyboard of the separable notebook computer to use the display system of the separable notebook computer as a normal tablet computer.

However, when using the abovementioned tablet computer or the separable notebook computer, the user may separate the display system and the keyboard and misplace the keyboard when it is not in use. Therefore, when the user needs to use the keyboard, the user must spend time to locate the misplaced keyboard.

Therefore, there is a need to provide a method allowing the user to locate quickly a keyboard or other peripheral device paired with the display system.

SUMMARY OF THE INVENTION

The object of the present invention is to provide a method of locating peripheral device, for application to an electronic device, to locate a peripheral device which is paired with the electronic device.

To achieve the abovementioned object, the method of locating peripheral device of the present invention is applied to an electronic device, and the electronic device is connected or electrically connected to a peripheral device. The electronic device includes a locating unit, a first connecting unit, a first transmitter and a display system. The peripheral device includes a second connecting unit and a second transmitter. The method of locating peripheral device includes: via the locating unit, obtaining a first location information; when the first connecting unit is connected to the second connecting unit, sending the first location information to the peripheral device; after the first connecting unit and the second connecting unit are separated, receiving the first location information sent by the second transmitter via the first transmitter; via the locating unit, obtaining a second location information; comparing the first location information and the second location information to determine the relative position of the electronic device and the peripheral device.

According to the first embodiment of the present invention, the method of locating peripheral device further includes: displaying the relative position of the electronic device and the peripheral device on the display system.

According to the first embodiment of the present invention, the method of locating peripheral device further includes: receiving a command to display the relative position on the display system.

According to the first embodiment of the present invention, the method of locating peripheral device further includes: receiving a command to stop receiving the first location information and controlling the first transmitter to stop receiving the first location information sent by the second transmitter.

According to the first embodiment of the present invention, the step of sending the first location information to the peripheral device when the first connecting unit is connected to the second connecting unit further includes: at a specific interval, sending the first location information to the peripheral device.

According to the second embodiment of the present invention, the method of locating peripheral device further includes: after the first connecting unit and the second connecting unit are separated, receiving a command to send a first location information request.

According to the second embodiment of the present invention, the step of receiving the first location information sent by the second transmitter via the first transmitter after the first connecting unit and the second connecting unit are separated further includes: via the first transmitter, sending the first location information request to the second transmitter to cause the peripheral device to send back the first location information according to the first location information request.

According to the second embodiment of the present invention, the method of locating peripheral device further includes: receiving a command to stop sending the first location information, and via the first transmitter, sending a request to stop sending the first location information to the second transmitter to cause the peripheral device to stop sending the first location information according to the request to stop sending the first location information.

According to the third embodiment of the present invention, the method of locating peripheral device further includes: when the first connecting unit is connected to the second connecting unit, setting up a first code lock in the peripheral device, wherein the first code lock can be unlocked via a first code information. The step of receiving a command to send a first location information request after the first connecting unit and the second connecting unit are separated further includes: obtaining a first code. The step of receiving the first location information sent by the second transmitter via the first transmitter after the first connecting unit and the second connecting unit are separated further includes: via the first transmitter, sending the first code to the second transmitter for the peripheral device to compare the first code and the first code information. After the peripheral device compares the first code and the first code information, the method of locating peripheral device further includes: if the first code matches the first code information, receiving via the first transmitter the first location information sent back by the second transmitter, wherein the first code lock for the first location information is unlocked.

According to the fourth embodiment of the present invention, the step of setting up a first code lock in the peripheral device when the first connecting unit is connected to the second connecting unit, wherein the first code lock can be unlocked via a first code information, further includes: setting up a second code lock which can be unlocked via a second code information. The step of receiving the first location information sent by the second transmitter via the first transmitter after the first connecting unit and the second connecting unit are separated further includes: encrypting the first location information by the second code lock. The method of locating peripheral device further includes: obtaining a second code; comparing the second code information and the second code; if the second code information matches the second code, decrypting the first location information which is encrypted by the second code lock.

According to the fifth embodiment of the present invention, the method of locating peripheral device further includes: displaying a start code inputting interface on the display system, wherein the start code inputting interface is encrypted by a start code information; receiving a start code via the display system; comparing the start code information and the start code; if the start code information matches the start code, unlocking the start code inputting interface or displaying a first mode menu on the display system; if the display system displays the first mode menu, receiving a first selection command via the display system; comparing the first selection command to determine if a first code is used; if so, displaying a second mode menu on the display system; receiving a second selection command via the display system; and comparing the second selection command to determine if a second code is used.

Another object of the present invention is to provide a computer program product for application to an electronic device to locate a peripheral device which is paired with the electronic device.

To achieve the abovementioned object, when an electronic device loads and executes the computer program product of the present invention, the abovementioned method of locating peripheral device can be achieved.

Another object of the present invention is to provide an electronic device to locate a peripheral device which is paired with the electronic device.

To achieve the abovementioned object, the electronic device of the present invention is electrically connected to a peripheral device, and the peripheral device includes a second connecting unit and a second transmitter. The electronic device includes a locating unit, a first connecting unit, a first transmitter, a first processing unit and a display system. The locating unit is used for obtaining a first location information and a second location information. The first connecting unit is used for sending the first location information to the peripheral device when connected to the second connecting unit. The first transmitter is used for receiving the first location information sent by the second transmitter after the first connecting unit and the second connecting unit are separated. The first processing unit is electrically connected to the locating unit, the first connecting unit and the first transmitter. The first processing unit is used for comparing the first location information and the second location information to determine the relative position of the electronic device and the peripheral device. The display system is electrically connected to the first processing unit, wherein the display system is used for displaying the relative position.

DETAILED DESCRIPTION OF THE PREFERRED EMBODIMENT

These and other objects and advantages of the present invention will become apparent from the following description of the accompanying drawings, which disclose several embodiments of the present invention. It is to be understood that the drawings are to be used for purposes of illustration only and not as a definition of the invention.

Figure 1:
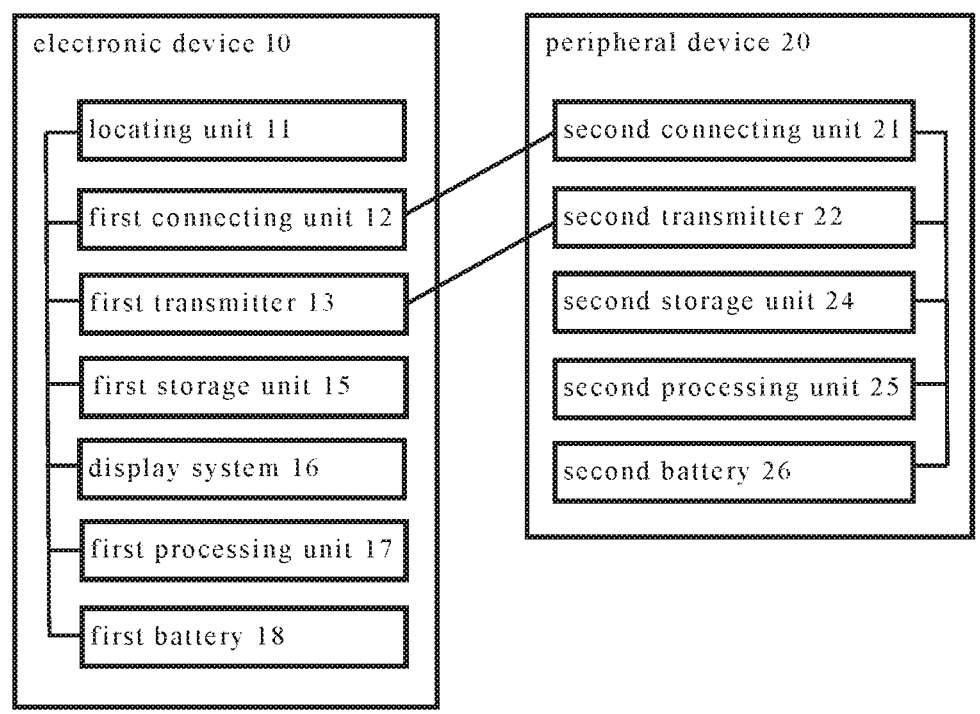
FIG. 1 illustrates a system structure drawing of the electronic device and the peripheral device according to the first embodiment of the present invention.
Figure 2:
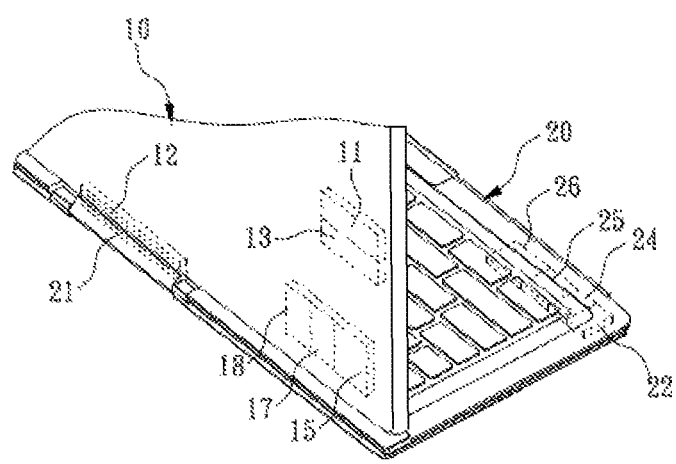
FIG. 2 illustrates a schematic drawing of the electronic device when connected to the peripheral device according to the first embodiment of the present invention.
Figure 3:
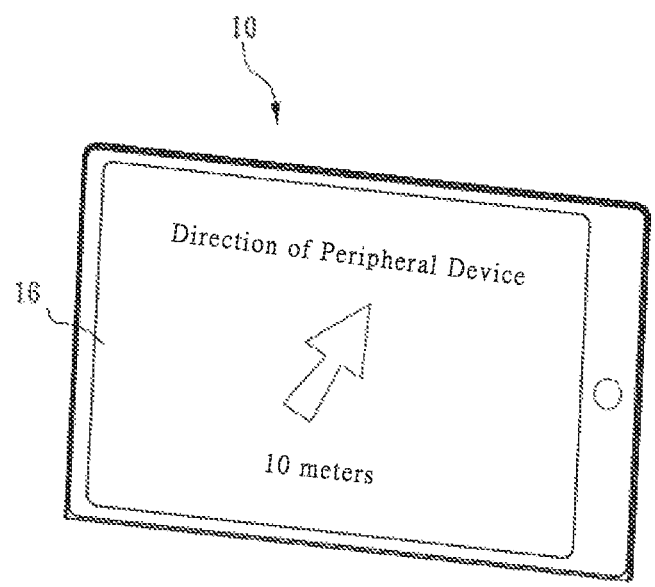
FIG. 3 illustrates a schematic drawing of the electronic device presenting the relative position of the electronic device and the peripheral device according to the first embodiment of the present invention.
Figure 4:
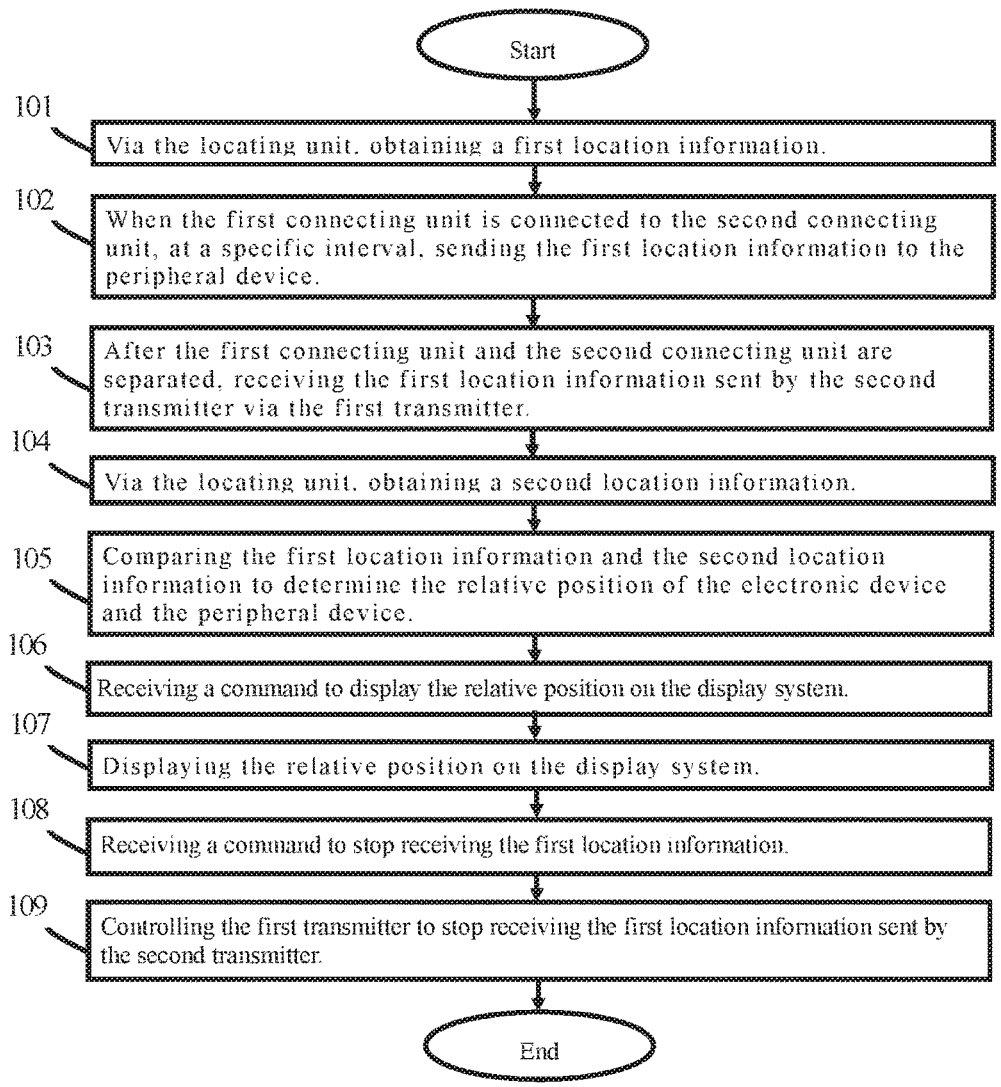
FIG. 4 illustrates a flowchart of the method of locating peripheral device according to the first embodiment of the present invention.

Please refer to FIG. 1 to FIG. 4 regarding the method of locating peripheral device in the first embodiment of the present invention. FIG. 1 illustrates a system structure drawing of the electronic device and the peripheral device according to the first embodiment of the present invention. FIG. 2 illustrates a schematic drawing of the electronic device when connected to the peripheral device according to the first embodiment of the present invention. FIG. 3 illustrates a schematic drawing of the electronic device presenting the relative position of the electronic device and the peripheral device according to the first embodiment of the present invention. FIG. 4 illustrates a flowchart of the method of locating peripheral device according to the first embodiment of the present invention.

As shown in FIG. 1 to FIG. 3, in the first embodiment of the present invention, the method of locating peripheral device of the present invention can be programmed as a computer program product. The computer program product can be stored in an electronic device 10 and provide a software interface for the user to use to quickly locate a peripheral device 20 which is paired with the electronic device 10. The electronic device 10 is, for example, a tablet computer. The electronic device 10 includes a locating unit 11, a first connecting unit 12, a first transmitter 13, a first storage unit 15, a display system 16, a first processing unit 17 and a first battery 18. The locating unit 11 can be a Global Positioning System (GPS) receiver for determining an absolute location of the electronic device 10 and for determining the current location of the electronic device 10. However, the type of the locating unit 11 is not limited to the abovementioned description; it can also be another unit which can provide a positioning function, such as a gyroscope which can detect the distance and direction of movement of the electronic device 10, an Inertial Navigation System (INS), or a combination of different locating units. The first connecting unit 12 is a connection port for physically connecting to the peripheral device 20, but the type of the first connecting unit 12 is not limited to the abovementioned description; the first connecting unit 12 can also be a wireless connecting unit, such as a Bluetooth module, for wirelessly connecting to the peripheral device 20. The first transmitter 13 is, for example, a Bluetooth module for transferring signals to the peripheral device 20 so as to establish an electrical connection between the electronic device 10 and the peripheral device 20. However, the type of the first transmitter 13 is not limited to the abovementioned description; it can also be a wireless connection module for wirelessly connecting to the peripheral device 20, or the first transmitter 13 can further include an infrared ray emitter for connecting to the peripheral device 20 via the method of emitting infrared rays. The first storage unit 15 is a memory module for storing the computer program product and the necessary data of the computer program product. The display system 16 is used for allowing the user to operate the device and for displaying the screen to the user; the display system 16 of this embodiment is a touch screen which combines the displaying function and inputting function, but the type of the display system 16 is not limited to this design; it can also be a normal screen or an electronic system formed via external inputting devices (such as a keyboard, a mouse, a trackpad, or a gesture sensor) which are connected to each other. The first processing unit 17 is a Central Processing Unit (CPU) and is electrically connected to the locating unit 11, the first connecting unit 12, the first transmitter 13, the first storage unit 15, the display system 16 and the first battery 18 for controlling those units. The first battery 18 is used for providing power to the electronic unit in the electronic device 10. However, the type of the electronic device 10 is not limited to the tablet computer; the electronic device 10 can also be a monitor of a separating notebook computer. It is to be known that, although the first connecting unit 12 and the first transmitter 13 can both be wireless connection units for wirelessly connecting to the peripheral device 20, the first transmitter 13 has a better connection capability, so the first transmitter 13 can be wirelessly connected to the peripheral device 20 over a longer distance or with a more stable connection quality. Therefore, even if the wireless connection between the first connecting unit 12 and the peripheral device 20 is disconnected, the first transmitter 13 can still be wirelessly connected to the peripheral device 20; in another preferred embodiment, the first connecting unit 12 and the first transmitter 13 can be combined into a single signal transmission device.

In the first embodiment of the present invention, the peripheral device 20 of the present invention is an external keyboard for physically connecting to the electronic device 10 to allow the user to use the keyboard of the peripheral device 20 to input words. However, the type of the peripheral device 20 is not limited to the external keyboard; it can be another external device which can provide multiple functions for the electronic device 10, such as an external mouse, an external gamepad, a mobile power pack, a keyboard of a separating notebook computer, a wireless keyboard or a wireless mouse. The peripheral device 20 includes a second connecting unit 21, a second transmitter 22, a second storage unit 24, a second processing unit 25 and a second battery 26. The second connecting unit 21 is a connector for physically connecting to the connecting port of the first connecting unit 12. Furthermore, when the first connecting unit 12 is connected to the second connecting unit 21, the electronic device 10 and the peripheral device 20 can transfer signals to each other via the physical connection between the first connecting unit 12 and the second connecting unit 21. However, if the peripheral device 20 is a wireless keyboard or a wireless mouse, then the second connecting unit 21 will correspondingly be a wireless connection unit such as a Bluetooth module for wirelessly connecting to the first connecting unit 12 of the electronic device 10; whereby, the electronic device 10 and the peripheral device 20 can transfer signals to each other via the wireless connection between the first connecting unit 12 and the second connecting unit 21. The second transmitter 22 can be a Bluetooth module for transferring signals to the first transmitter 13 of the electronic device 10 to form a wireless connection between the electronic device 10 and the peripheral device 20. However, the type of the second transmitter 22 is not limited to the abovementioned description and can be another transmission unit which can work with the first transmitter 13; for example, if the first transmitter 13 is a wireless connection module, then the second transmitter 22 should also be a wireless connection module, or if the first transmitter 13 further includes an infrared ray emitter, then the second transmitter 22 should also include an infrared ray reflective tag. The second storage unit 24 is a memory module for storing the necessary data of the computer program product. The second processing unit 25 is a central processing unit and is electrically connected to the second connecting unit 21, the second transmitter 22, the second storage unit 24 and the second battery 26 for controlling those units. The second battery 26 is used for providing power to the electronic units in the peripheral device 20. It is to be known that, although the second connecting unit 21 and the second transmitter 22 can both be wireless connection units for wirelessly connecting to the electronic device 10, the second transmitter 22 has a better connection capability, so the second transmitter 22 can be wirelessly connected to the electronic device 10 over a longer distance or with a more stable connection quality. Therefore, even if the wireless connection between the second connecting unit 21 and the electronic device 10 is disconnected, the second transmitter 22 can still be wirelessly connected to the electronic device 10; in another preferred embodiment, the second connecting unit 21 and the second transmitter 22 can be combined into a single signal transmission device to transfer signals to the electronic device 10.

In the first embodiment of the present invention, when the electronic device 10 loads and executes the computer program product, as shown in FIG. 4, the following method of locating peripheral device will be executed. At first, executing Step 101: via the locating unit, obtaining a first location information.

As shown in FIG. 1 and FIG. 2, in the first embodiment of the present invention, the first processing unit 17 of the electronic device 10 controls the locating unit 11 to cause the Global Positioning System receiver of the locating unit 11 to obtain a first location information according to the absolute location of the electronic device 10. Since the user may move the electronic device 10 to another location, then if the locating unit 11 detects that the location of the electronic device 10 changes, the locating unit 11 will also obtain the updated first location information according to the newly changed location. However, if the locating unit 11 is not a Global Positioning System receiver and is instead a specific unit (such as a gyroscope) which can only detect the distance and direction of movement of the electronic device 10 and cannot detect the absolute location, then the gyroscope of the locating unit 11 can continue recording the changes in the location of the electronic device 10 according to the movement of the electronic device 10 to obtain the location information.

Then, executing Step 102: when the first connecting unit is connected to the second connecting unit, at a specific interval, sending the first location information to the peripheral device.

In the first embodiment of the present invention, when the user causes the first connecting unit 12 and the second connecting unit 21 to connect to each other physically or wirelessly, then via the physical or wireless connection between the first connecting unit 12 and the second connecting unit 21, at a specific interval, the first processing unit 17 will send the first location information to the peripheral device 20 via the first transmitter 13, and the first location information will be stored in the second storage unit 24; or the first processing unit 17 will send the first location information to the peripheral device 20 via the physical or wireless connection between the first connecting unit 12 and the second connecting unit 21, and the first location information will be stored in the second storage unit 24. In the first embodiment, the time range of the specific interval is between 5 minutes and 10 minutes, but the time range of the specific interval is not limited to that design. The mechanism of sending the first location information at regular intervals functions such that even if the user moves the electronic device 10 and the peripheral device 20 to another place and the relative position of the electronic device 10 and the peripheral device 20 change, the second storage unit 24 can still receive the updated first location information at regular intervals.

Then, executing Step 103: after the first connecting unit and the second connecting unit are separated, receiving the first location information sent by the second transmitter via the first transmitter.

In the first embodiment of the present invention, according to the general usage, if the user causes the first connecting unit 12 and the second connecting unit 21 to separate from each other physically or wirelessly, then the user needs to make the electronic device 10 more portable so that the user can carry it easily, implying that the user may move the electronic device 10 to another location and leave the peripheral device 20 in its current location. Furthermore, after the user causes the first connecting unit 12 and the second connecting unit 21 to separate from each other physically or wirelessly, the physical or wireless connection between the first connecting unit 12 and the second connecting unit 21 will be disconnected; therefore, the locating unit 11 will not send the updated first location information to the peripheral device 20 via the connection between the first connecting unit 12 and the second connecting unit 21. Therefore, after the peripheral device 20 is separated from the electronic device 10, the first location information stored in the second storage unit 24 of the peripheral device 20 remains as the current location information of the peripheral device 20. At this moment, the second processing unit 25 of the peripheral device 20 will control the second transmitter 22 to send the first location information stored in the second storage unit 24 to the first transmitter 13 of the electronic device 10 with a wireless signal. It is to be known that, if the first connecting unit 12 and the second connecting unit 21 are units which provide a wireless connecting function, the first transmitter 13 and the second transmitter 22 have better connecting capability than the first connecting unit 12 and the second connecting unit 21, so even if the wireless connection between the first connecting unit 12 and the second connecting unit 21 is disconnected, the first transmitter 13 and the second transmitter 22 can still be wirelessly connected to each other to transfer signals.

Then, executing Step 104: via the locating unit, obtaining a second location information.

In the first embodiment of the present invention, after the electronic device 10 and the peripheral device 20 are separated, the first processing unit 17 controls the locating unit 11 to cause the Global Positioning System receiver of the locating unit 11 to obtain a second location information according to the new absolute location of the electronic device 10. However, if the locating unit 11 is not a Global Positioning System receiver and the locating unit 11 is a specific unit (such as a gyroscope) which can only detect the distance and direction of movement of the electronic device 10 and cannot detect the absolute location, then the gyroscope of the locating unit 11 can continue recording the changes in the location of the electronic device 10 which is separated from the peripheral device 20 to obtain location information which is a record of the location changes of the separated electronic device 10.

Then, executing Step 105: comparing the first location information and the second location information to determine the relative position of the electronic device and the peripheral device.

In the first embodiment of the present invention, the first processing unit 17 compares the first location information and the second location information sent back by the peripheral device 20. Because the first location information can display the absolute location of the peripheral device 20, which is stationary, and the second location information can display the new absolute location of the electronic device 10, which has been moved, then by the comparing the first location information and the second location information, the first processing unit 17 can determine the relative position of the electronic device 10 and the peripheral device 20. However, if the first location information is the record of changes in location of the electronic device 10 recorded by the gyroscope of the locating unit 11 and the second location information is the record of changes in location of the electronic device 10 separated from the peripheral device 20 recorded by the gyroscope of the locating unit 11, then the first processing unit 17 can determine the relative position of the electronic device 10 and the peripheral device 20 according to the changes and differences in the two records of changes in location.

Then, executing Step 106: receiving a command to display the relative position on the display system.

In the first embodiment of the present invention, after the electronic device 10 and the peripheral device 20 are separated, if the user wants to quickly discover the location of the peripheral device 20, then the user can operate the display system 16 and use the software interface of the computer program product of the present invention to enter a command to display the relative position on the display system 16. When the display system 16 receives the command, the display system 16 will send the command to the first processing unit 17.

Then, executing Step 107: displaying the relative position on the display system.

As shown in FIG. 1 and FIG. 3, the first processing unit 17 controls the display system 16 to display the information of the relative position of the electronic device 10 and the peripheral device 20, such as displaying the relative direction and relative distance of the peripheral device 20 relative to the electronic device 10. Therefore, by viewing the information of the relative position shown on the display system 16, the user can obtain the location of the peripheral device 20 and quickly locate the peripheral device 20 according to the information of the relative position shown on the display system 16.

Then, executing Step 108: receiving a command to stop receiving the first location information.

In the first embodiment of the present invention, after the user finds the peripheral device, there is no need for the display system 16 to display the relative position of the electronic device 10 and the peripheral device 20. Therefore, the user can operate the display system 16 to use the software interface of the computer program product of the present invention to give the command to stop receiving the first location information. When the display system 16 receives the command, the display system 16 will send the command to the first processing unit 17. However, the method of giving the command to stop receiving the first location information of the present invention is not limited to that design; in the first embodiment of the present invention, the action of connecting the first connecting unit 12 and second connecting unit 21 can also be considered as giving the command to stop receiving the first location information; therefore, the user can also cause the first connecting unit 12 to connect to the second connecting unit 21 to give the command to stop receiving the first location information.

Finally, executing Step 109: controlling the first transmitter to stop receiving the first location information sent by the second transmitter.

In the first embodiment of the present invention, after the first processing unit 17 receives the command to stop receiving the first location information, the first processing unit 17 will control the first transmitter 13 to stop receiving the first location information sent by the second transmitter 22. Therefore, the method of locating peripheral device of the present invention is achieved.

Figure 5:
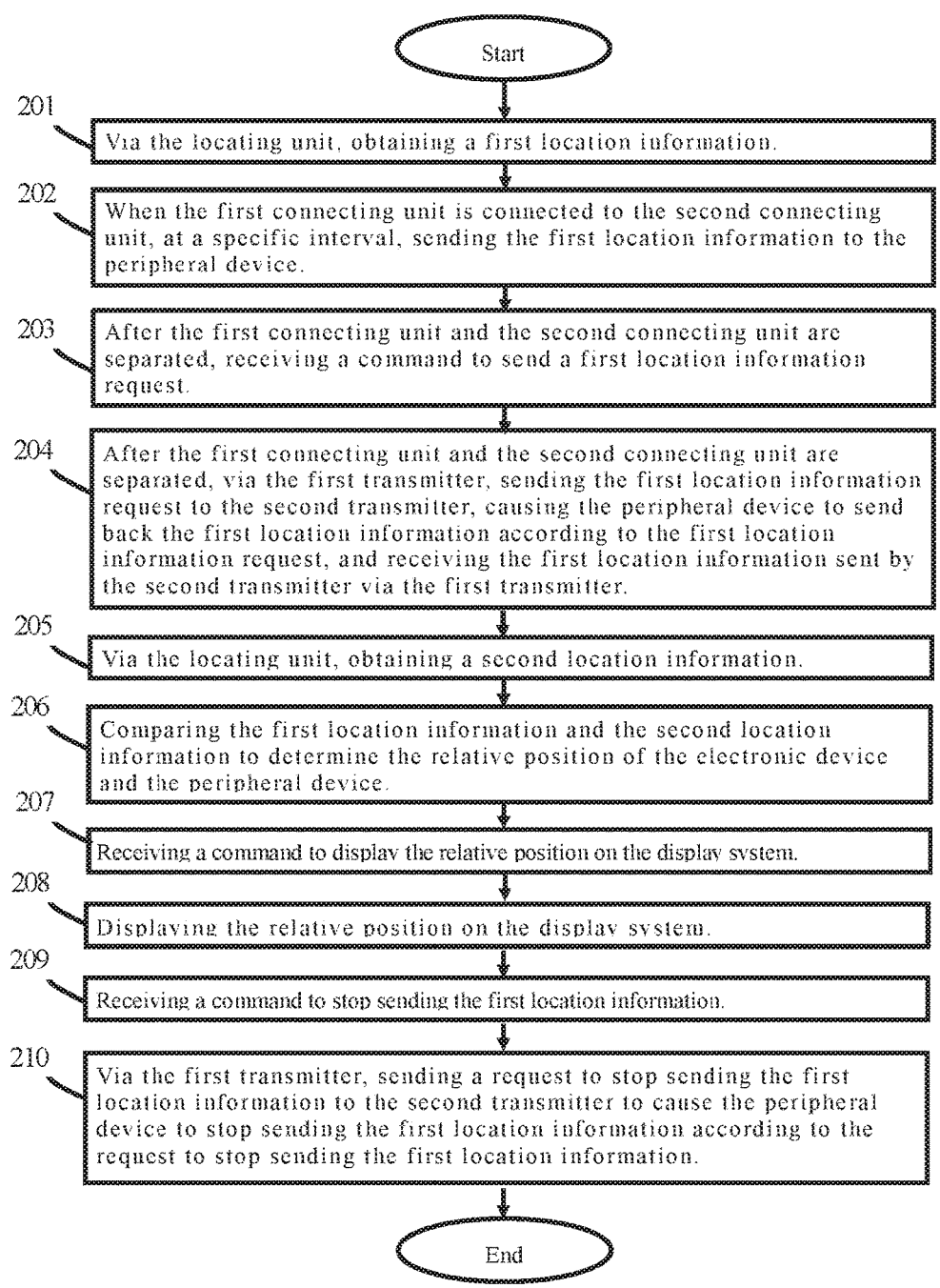
FIG. 5 illustrates a flowchart of the method of locating peripheral device according to the second embodiment of the present invention.

Please refer to FIG. 5 about the method of locating peripheral device in the second embodiment of the present invention. FIG. 5 illustrates a flowchart of the method of locating peripheral device according to the second embodiment of the present invention.

As shown in FIG. 5, the difference between the second embodiment and the first embodiment is that, in the second embodiment, after Step 202 (wherein Step 202 equals Step 102 of the first embodiment) is executed, executing Step 203: after the first connecting unit and the second connecting unit are separated, receiving a command to send a first location information request.

In the second embodiment of the present invention, after the first connecting unit 12 and the second connecting unit 21 are physically or wirelessly separated, the user can operate the display system 16 and use the software interface of the computer program product of the present invention to send a request for a first location information. When the display system 16 receives the request, the display system 16 will send the request to the first processing unit 17.

Then, executing Step 204: after the first connecting unit and the second connecting unit are separated, via the first transmitter, sending the first location information request to the second transmitter, causing the peripheral device to send back the first location information according to the first location information request, and receiving the first location information sent by the second transmitter via the first transmitter.

As shown in FIG. 1, in the second embodiment of the present invention, after the first connecting unit 12 and the second connecting unit 21 are physically or wirelessly separated, the first processing unit 17 will control the first transmitter 13 to send the first location information request to the second transmitter 22. The second transmitter 22 will send the first location information request to the second processing unit 25. After the second processing unit 25 receives the first location information request, the second processing unit 25 will obtain the first location information from the second storage unit 24 and send the first location information to the first transmitter 13 via the second transmitter 22. Therefore, the first transmitter 13 can receive the first location information sent by the second transmitter 22.

Then, after sequentially executing Step 205 to Step 208 (which equals Step 104 to Step 107 in the first embodiment), executing Step 209: receiving a command to stop sending the first location information.

In the second embodiment of the present invention, after the user finds the peripheral device 20, there is no need for the peripheral device 20 to send the first location information. Therefore, the user can operate the display system 16 to use the software interface of the computer program product of the present invention to give the command to stop sending the first location information. When the display system 16 receives the command, the display system 16 will send the command to the first processing unit 17.

Finally, executing Step 210: via the first transmitter, sending a request to stop sending the first location information to the second transmitter to cause the peripheral device to stop sending the first location information according to the request to stop sending the first location information.

As shown in FIG. 1, in the second embodiment of the present invention, after the first processing unit 17 receives the command to stop sending the first location information sent from the display system 16 in Step 209, the first processing unit 17 will control the first transmitter 13 to send a request to stop sending the first location information to the second transmitter 22. The second transmitter 22 will send the request to stop sending the first location information to the second processing unit 25. After the second processing unit 25 receives the request to stop sending the first location information, the second processing unit 25 will control the second transmitter 22 to stop sending the first location information to the first transmitter 13. Therefore, the first transmitter 13 will no longer receive the first location information, and the method of locating peripheral device of the second embodiment of the present invention can be achieved.

Figure 6:
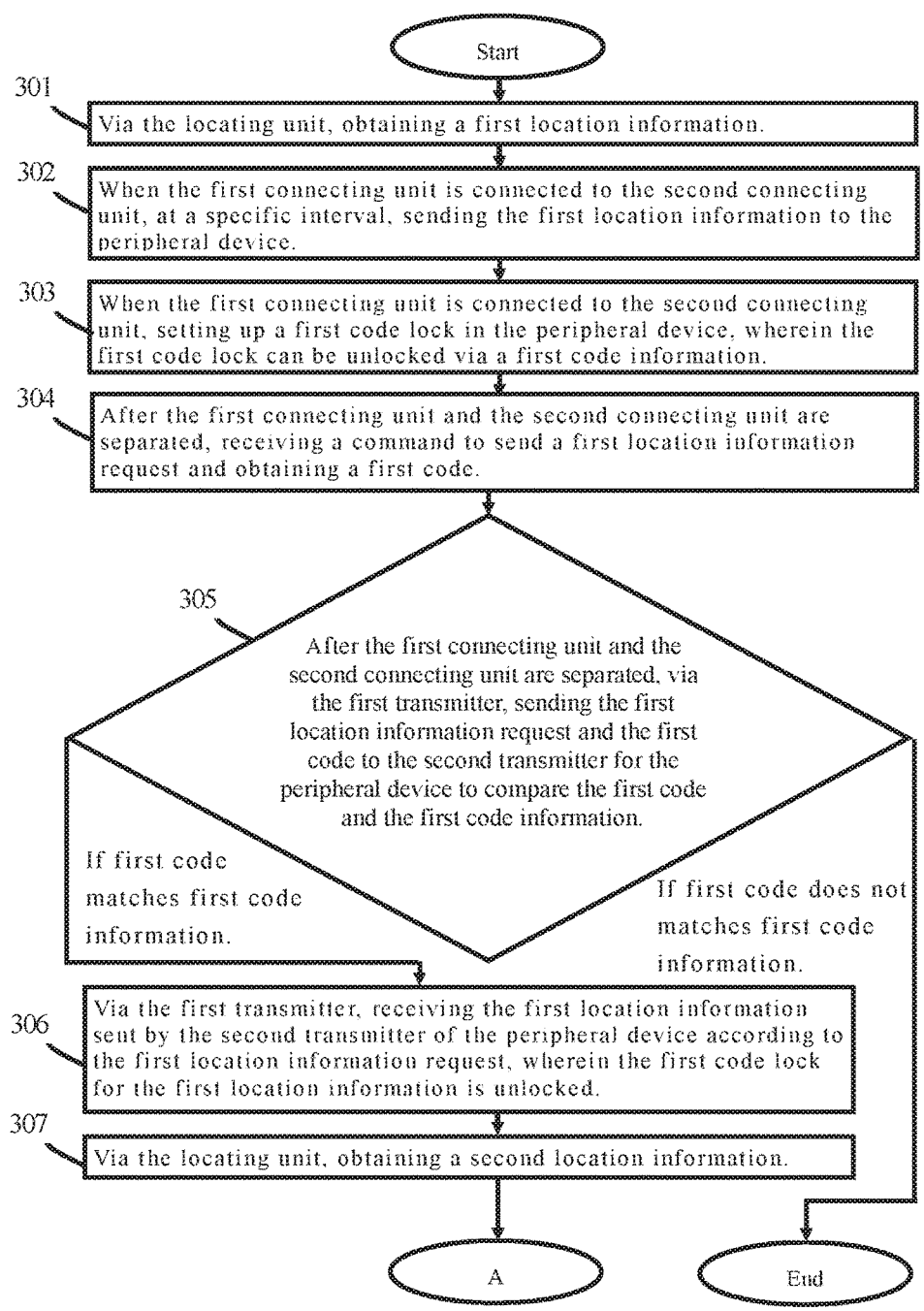
FIG. 6 illustrates the first part of a flowchart of the method of locating peripheral device according to the third embodiment of the present invention.
Figure 7:
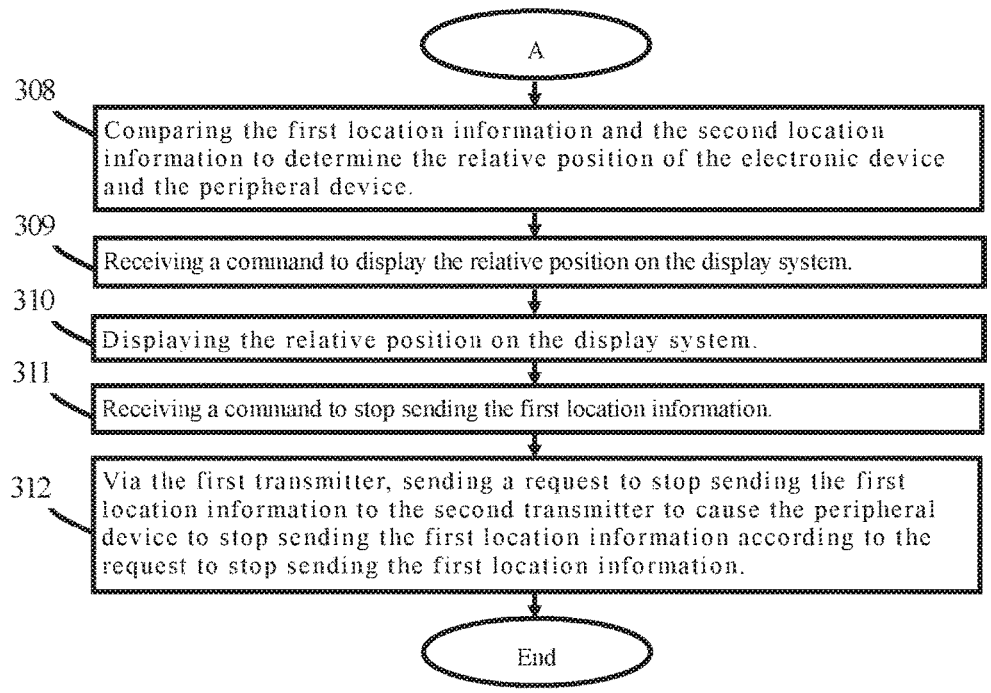
FIG. 7 illustrates the second part of a flowchart of the method of locating peripheral device according to the third embodiment of the present invention.

Please refer to FIG. 6 and FIG. 7 about the method of locating peripheral device in the third embodiment of the present invention. FIG. 6 illustrates the first part of a flowchart of the method of locating peripheral device according to the third embodiment of the present invention. FIG. 7 illustrates the second part of a flowchart of the method of locating peripheral device according to the third embodiment of the present invention.

As shown in FIG. 6 and FIG. 7, the difference between the third embodiment and the second embodiment is that, in the third embodiment, after Step 302 (wherein Step 302 equals Step 202 of the second embodiment) is executed, executing Step 303: when the first connecting unit is connected to the second connecting unit, setting up a first code lock in the peripheral device, wherein the first code lock can be unlocked via a first code information.

In the third embodiment of the present invention, when the first connecting unit 12 is physically or wirelessly connected to the second connecting unit 21, the first processing unit 17 controls the display system 16 to display a code setting menu to allow the user to set up a code (such as a code in the form of a number or line). The display system 16 receives the code set up by the user and sends the code to the first processing unit 17; then the first processing unit 17 will set up a first code lock according to the received code and consider the received code as the first code information, wherein the first code lock can be unlocked via the first code information. Then the first processing unit 17 sends the first code lock to the second processing unit 25 of the peripheral device 20 via the connection between the first connecting unit 12 and the second connecting unit 21, and the second processing unit 25 controls the first code lock to encrypt the first location information to prevent the first location information from being known by others.

Then, executing Step 304: after the first connecting unit and the second connecting unit are separated, receiving a command to send a first location information request and obtaining a first code.

In the third embodiment of the present invention, after the first connecting unit 12 and the second connecting unit 21 are physically or wirelessly separated, the user can operate the display system 16 to use the software interface of the computer program product of the present invention to send a request for a first location information. When the display system 16 receives the request, the display system 16 will display a first code inputting interface for the user to input the first code (which is the code set up by the user in Step 303) using the touching method. After the display system 16 receives the first code, the display system 16 will send the first code and the command to the first processing unit 17.

Then, executing Step 305: after the first connecting unit and the second connecting unit are separated, via the first transmitter, sending the first location information request and the first code to the second transmitter for the peripheral device to compare the first code and the first code information.

In the third embodiment of the present invention, after the first connecting unit 12 and the second connecting unit 21 are physically or wirelessly separated, if the first processing unit 17 receives the first location information request and the first code sent by the display system 16, the first processing unit 17 will control the first transmitter 13 to send the first location information request and the first code to the second transmitter 22. After the second transmitter 22 receives the first location information request and the first code, the second transmitter 22 will send the first location information request and the first code to the second processing unit 25, and the second processing unit 25 compares the first code and the first code information to determine if the first code and the first code information match.

If the first code does not match the first code information, the method of locating peripheral device of the third embodiment will end and the following step will not be executed. If the first code matches the first code information, then executing Step 306: via the first transmitter, receiving the first location information sent by the second transmitter of the peripheral device according to the first location information request, wherein the first code lock for the first location information is unlocked.

In the third embodiment of the present invention, after the second transmitter 22 receives the first location information request and the first code and sends the first code to the second processing unit 25, if the second processing unit 25 compares the first code and the first code information and determines that the first code matches the first code information, then the second processing unit 25 will use the first code information to unlock the first code lock, and the second processing unit 25 will control the second transmitter 22 to send back the unlocking first location information to the first transmitter 13 according to the first location information request.

Then, sequentially executing Step 307 to Step 312 (which are equal to Step 205 to Step 210 in the second embodiment), the method of locating peripheral device of the third embodiment can be achieved.

Figure 8:
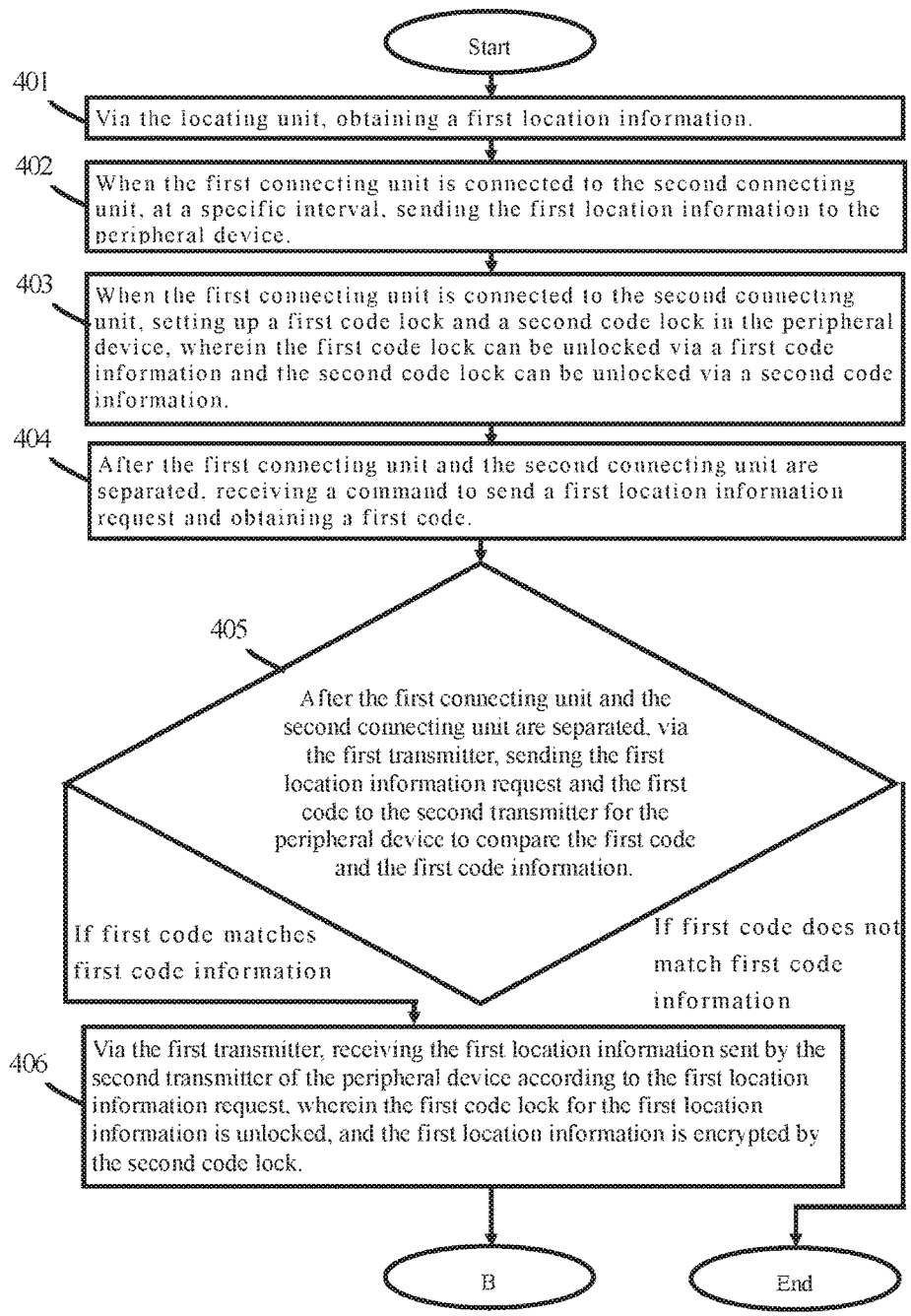
FIG. 8 illustrates the first part of a flowchart of the method of locating peripheral device according to the fourth embodiment of the present invention.
Figure 9:
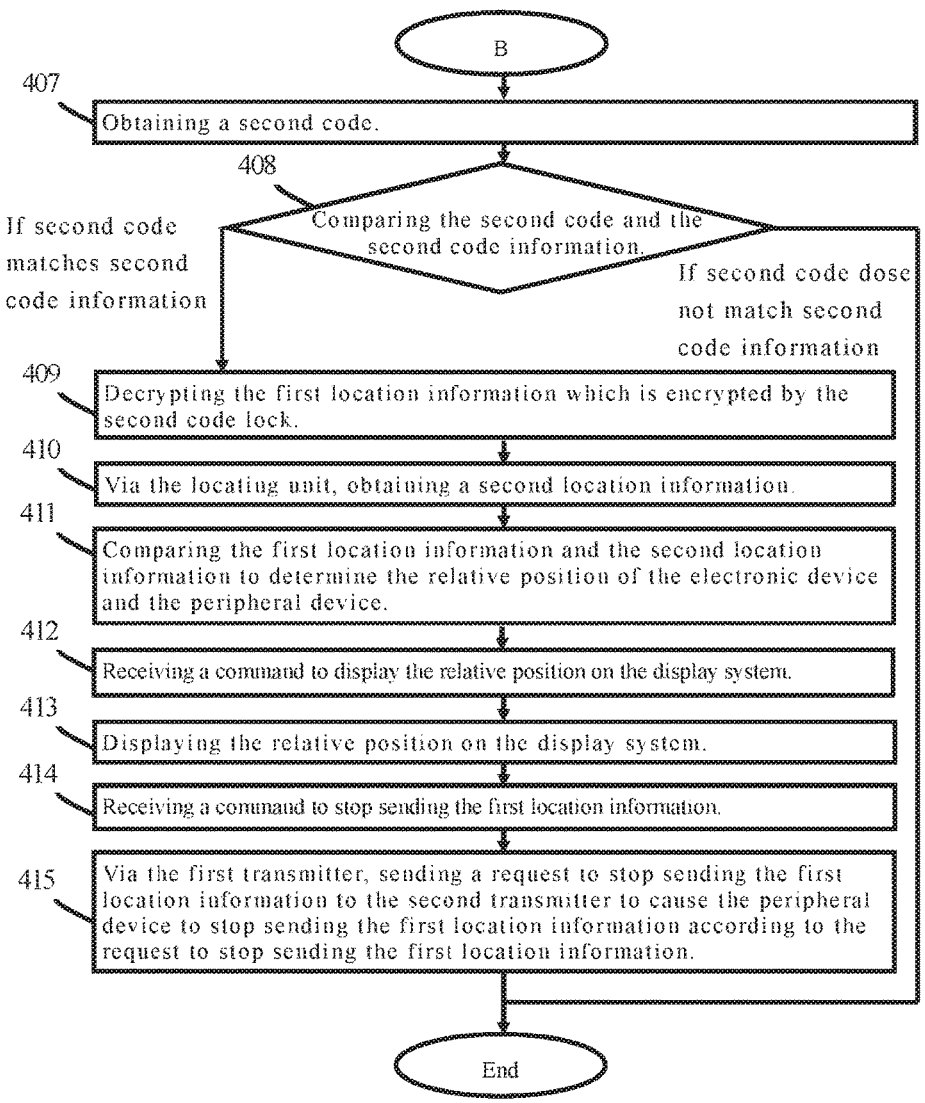
FIG. 9 illustrates the second part of a flowchart of the method of locating peripheral device according to the fourth embodiment of the present invention.

Please refer to FIG. 8 and FIG. 9 about the method of locating peripheral device in the fourth embodiment of the present invention. FIG. 8 illustrates the first part of a flowchart of the method of locating peripheral device according to the fourth embodiment of the present invention. FIG. 9 illustrates the second part of a flowchart of the method of locating peripheral device according to the fourth embodiment of the present invention.

As shown in FIG. 8 and FIG. 9, the difference between the fourth embodiment and the third embodiment is that, in the fourth embodiment, after executing Step 402 (Step 402 is equal to Step 302 in the third embodiment), executing Step 403: when the first connecting unit is connected to the second connecting unit, setting up a first code lock and a second code lock in the peripheral device, wherein the first code lock can be unlocked via a first code information and the second code lock can be unlocked via a second code information.

In the fourth embodiment of the present invention, when the first connecting unit 12 is physically or wirelessly connected to the second connecting unit 21, the first processing unit 17 will control the display system 16 to display a code setting menu for the user to set up a code (such as a code in the form of a number or line). The display system 16 receives the code set up by the user and sends the code to the first processing unit 17. The first processing unit 17 sets up a first code lock according to the received code and considers the received code as the first code information; at this moment, the first processing unit 17 also obtains the serial number of the electronic device 10, considers the serial number as the second code information, and sets up a second code lock according to the serial number of the electronic device 10. The first code lock can be unlocked via the first code information, and the second code lock can be unlocked via the second code information. However, the second code information is not limited to the serial number; the second code information can also be other specific information of the electronic device 10, such as an Integrated Circuit Card Identity (ICCID) or a code in the form of a number or line which is set up by the user in advance. Then, via the connection between the first connecting unit 12 and the second connecting unit 21, the first processing unit 17 sends the first code lock and the second code lock to the second processing unit 25 of the peripheral device 20, and the second processing unit 25 controls the first code lock and the second code lock to encrypt the first location information to prevent the first location information from being known by others.

Then, after executing Step 404 to 405 (Step 404 to 405 are equal to Step 304 to 305 in the second embodiment), if the first code matches the first code information, executing Step 406: via the first transmitter, receiving the first location information sent by the second transmitter of the peripheral device according to the first location information request, wherein the first code lock for the first location information is unlocked, and the first location information is encrypted by the second code lock.

In the fourth embodiment of the present invention, after the second transmitter 22 receives the first location information request and the first code and sends the first location information request and the first code to the second processing unit 25, if the second processing unit 25 compares the first code and the first code information and determines that the first code matches the first code information, then the second processing unit 25 will use the first code information to unlock the first code lock and cause the second code lock to encrypt the first code information. Then, according to the first location information request, the second processing unit 25 controls the second transmitter 22 to send back the first code information to the first transmitter 13, wherein the first code lock for the first location information is unlocked by the second processing unit 25 by using the first code, but the first location information is still encrypted by the second code lock.

Then, executing Step 407: obtaining a second code.

After the first transmitter 13 receives the first location information which is still encrypted by the second code lock, the first processing unit 17 will obtain the serial number of the electronic device 10 for use as the second code.

Then, executing Step 408: comparing the second code and the second code information.

After the first processing unit 17 obtains the serial number of the electronic device 10 for use as the second code, the first processing unit 17 compares the second code and the second code information to determine if the second code matches the second code information.

If the second code does not match the second code information, then the method of locating peripheral device of the fourth embodiment will be ended and the following step will not be executed. If the second code matches the second code information, then executing Step 409: decrypting the first location information which is encrypted by the second code lock.

If the first processing unit 17 compares the second code and the second code information and determines that the second code matches the second code information, then the first processing unit 17 will use the second code information to decrypt the second code lock to obtain the first location information which is unlocked completely.

Then, sequentially executing Step 410 to Step 415 (which are equal to Step 307 to Step 312 in the third embodiment), the method of locating peripheral device of the fourth embodiment can be achieved.

Figure 10:
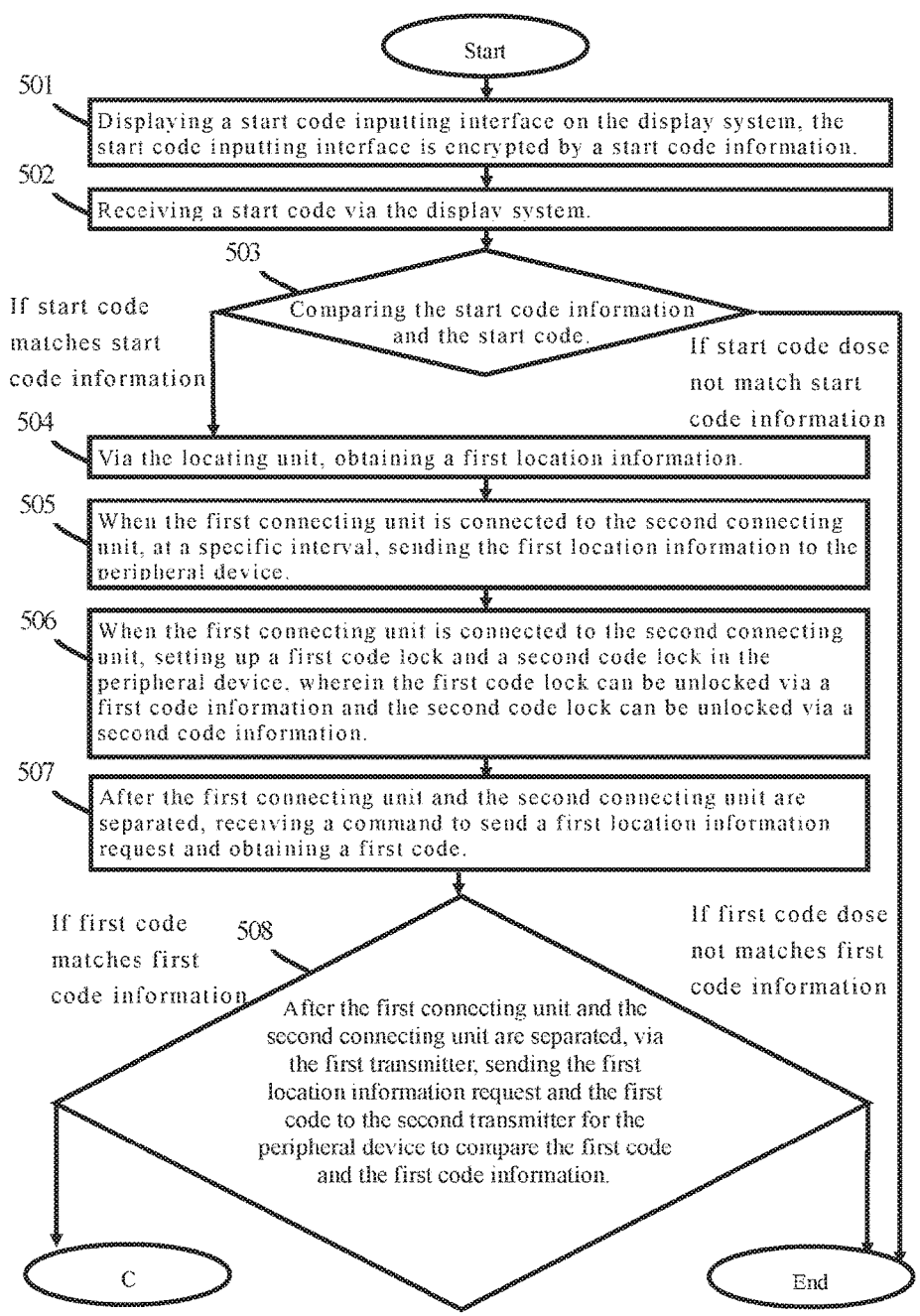
FIG. 10 illustrates the first part of a flowchart of the method of locating peripheral device according to the fifth embodiment of the present invention.
Figure 11:
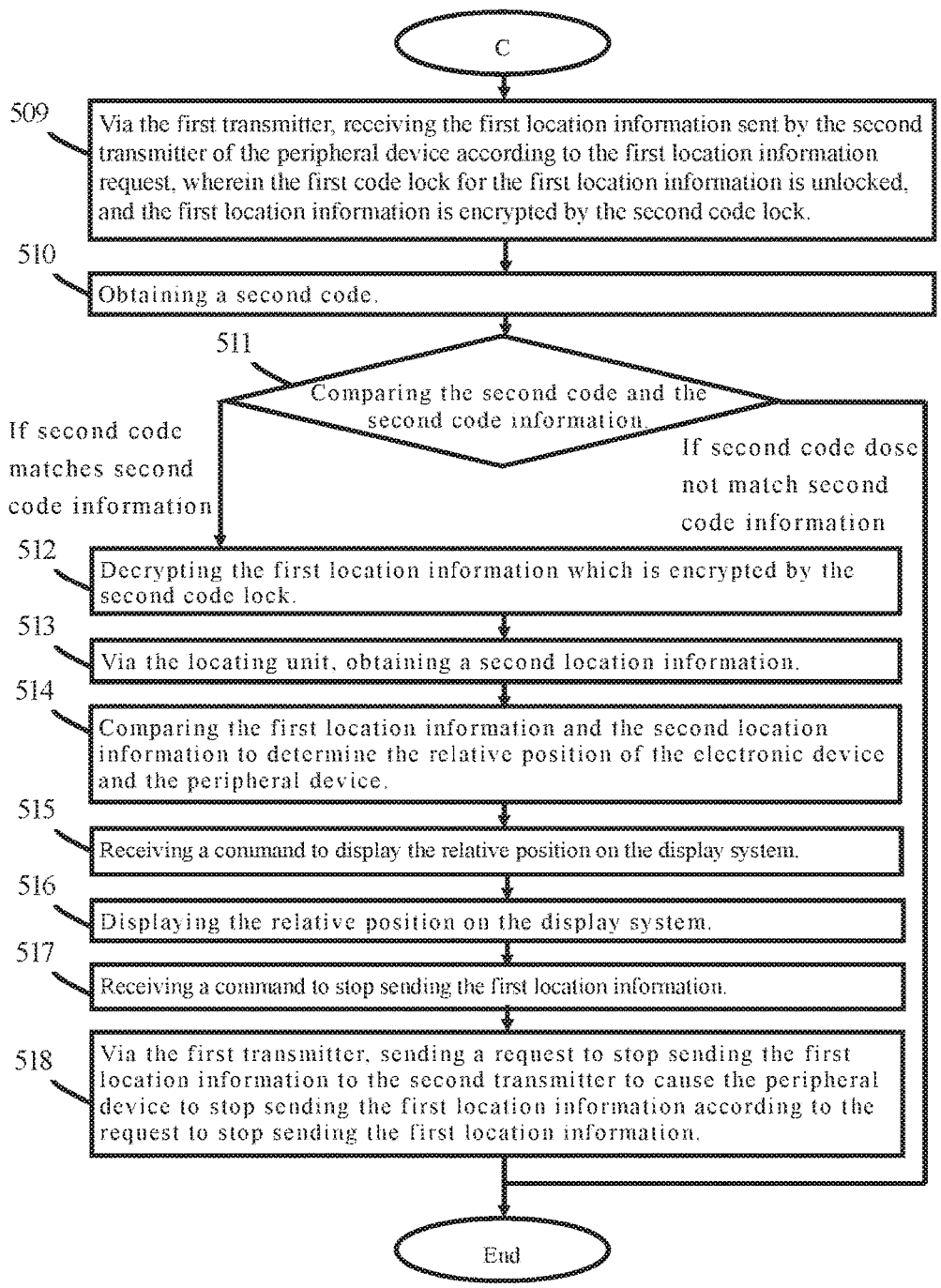
FIG. 11 illustrates the second part of a flowchart of the method of locating peripheral device according to the fifth embodiment of the present invention.

Please refer to FIG. 10 and FIG. 11 about the method of locating peripheral device in the fifth embodiment of the present invention. FIG. 10 illustrates the first part of a flowchart of the method of locating peripheral device according to the fifth embodiment of the present invention. FIG. 11 illustrates the second part of a flowchart of the method of locating peripheral device according to the fifth embodiment of the present invention.

As shown in FIG. 10 and FIG. 11, the difference between the fifth embodiment and the fourth embodiment is that, in the fifth embodiment, at first, the electronic device 10 provides a start code inputting interface; the user must input a correct start code into the start code inputting interface to use the following function of finding the peripheral device 20. Therefore, in the fifth embodiment, before executing Step 504 (Step 504 being equal to Step 401 in the fourth embodiment), sequentially executing Step 501 to 503, wherein Step 501 is the step of displaying a start code inputting interface on the display system; the start code inputting interface is encrypted by a start code information.

In the fifth embodiment, the first processing unit 17 controls the display system 16 to display a start code inputting interface. The start code inputting interface is encrypted by a start code information. The start code information of the fifth embodiment is a code in the form of a number or line which is set up by the user in the electronic device 10 in advance. The start code inputting interface is used for limiting the permission of using the computer program product of the present invention; only a user who knows the start code information can unlock the start code inputting interface and normally use the function of finding the peripheral device 20.

Then, executing Step 502: receiving a start code via the display system.

If the user wants to normally use the function of finding the peripheral device 20, the user must input the start code on the display system 16. After the display system 16 receives the start code, the start code 16 will be sent to the first processing unit 17.

Then, executing Step 503: comparing the start code information and the start code.

After the first processing unit 17 receives the start code, the first processing unit 17 compares the start code and the start code information to determine if the start code matches the start code information.

If the start code does not match the start code information, then the method of locating peripheral device of the fifth embodiment will be ended and the following step will not be executed. If the start code matches the start code information, then the following step can be executed and the user can normally use the function of finding the peripheral device 20.

Figure 12:
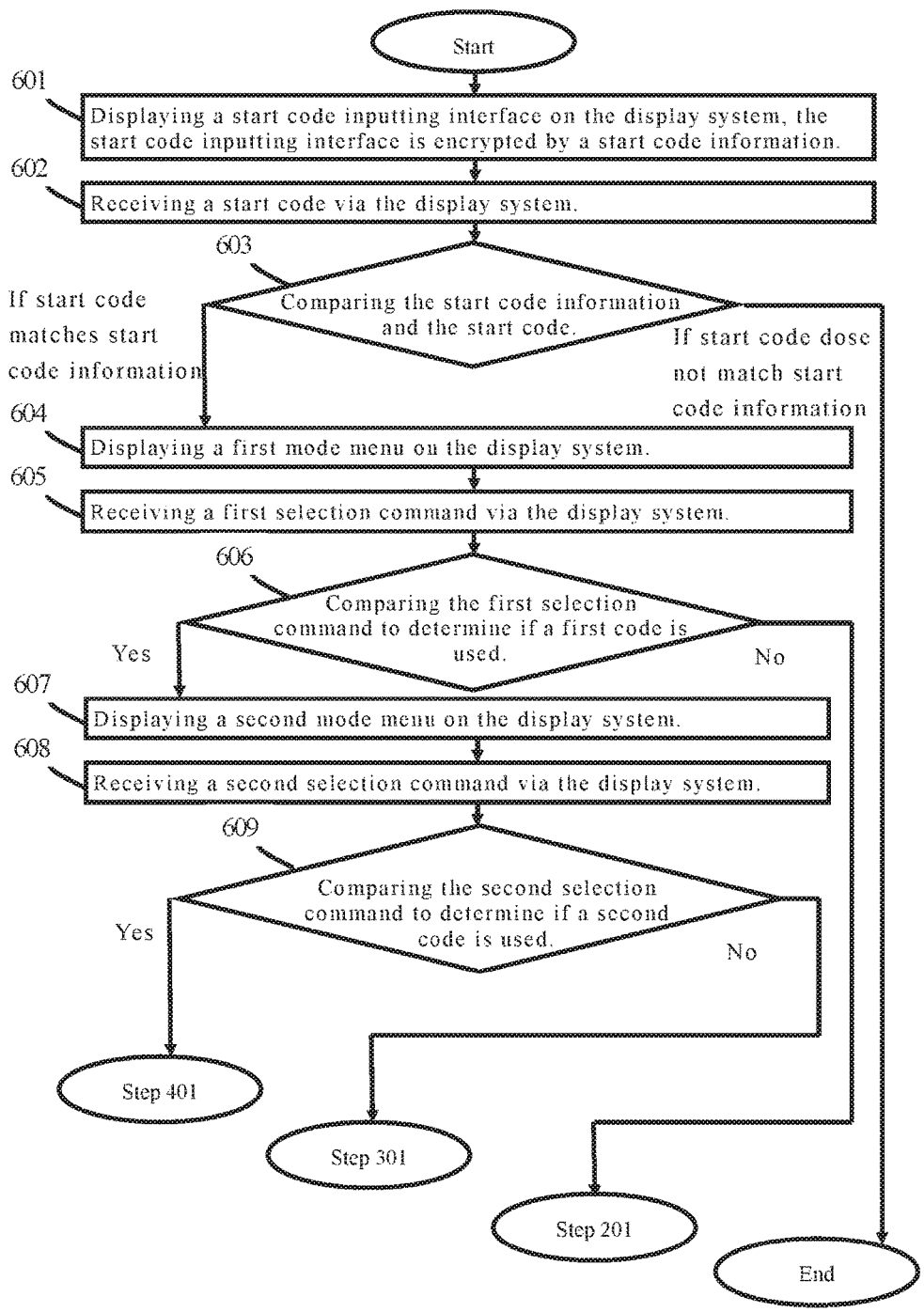
FIG. 12 illustrates a flowchart of the method of locating peripheral device according to the sixth embodiment of the present invention.
Figure 13:
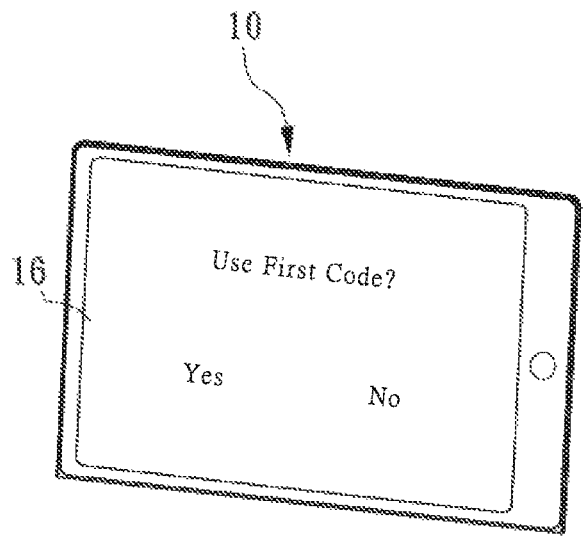
FIG. 13 illustrates a schematic drawing of the electronic device displaying the first mode menu according to the sixth embodiment of the present invention.
Figure 14:
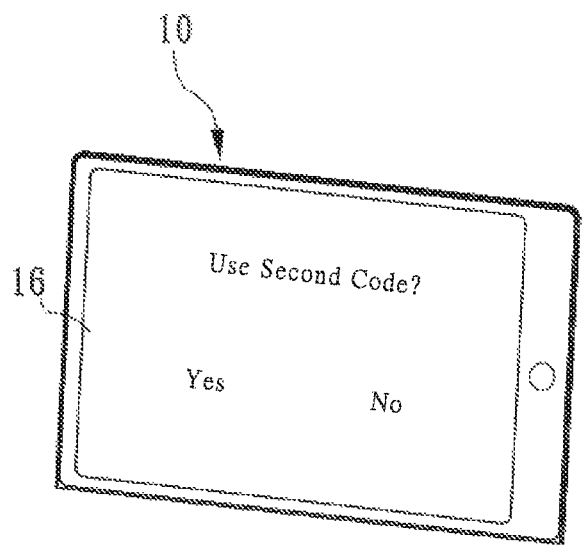
FIG. 14 illustrates a schematic drawing of the electronic device displaying the second mode menu according to the sixth embodiment of the present invention.

Please refer to FIG. 12 to FIG. 14 about the method of locating peripheral device in the sixth embodiment of the present invention. FIG. 12 illustrates a flowchart of the method of locating peripheral device according to the sixth embodiment of the present invention. FIG. 13 illustrates a schematic drawing of the electronic device displaying the first mode menu according to the sixth embodiment of the present invention. FIG. 14 illustrates a schematic drawing of the electronic device displaying the second mode menu according to the sixth embodiment of the present invention.

As shown in FIG. 12 to FIG. 14, the difference between the sixth embodiment and the fifth embodiment is that, in the sixth embodiment, the start code inputting interface of the sixth embodiment can also be used for allowing the user to choose the desired operation mode, such as inputting different commands to choose the operation modes of the second embodiment, the third embodiment or the fourth embodiment of the present invention. Therefore, in the sixth embodiment, after executing Step 603 (Step 603 being equal to Step 503 in the fifth embodiment), if the start code matches the start code information, executing Step 604: displaying a first mode menu on the display system.

In the sixth embodiment of the present invention, after the first processing unit 17 receives the start code 16, the first processing unit 17 compares the start code and the start code information to determine if the start code matches the start code information. If the first processing unit 17 determines that the start code matches the start code information, then the first processing unit 17 will control the display system 16 to display a first mode menu. The first mode menu asks the user if the user wants to use the first code and provides buttons for indicating "Yes" and "No". However, the type of the first mode menu is not limited to that design; the form and the terms of the first mode menu can be changed according to variable design requirements.

Then, executing Step 605: receiving a first selection command via the display system.

The user can press the "Yes" or "No" button shown on the display system 16 according to the requirement of the user to give the first selection command representing "Yes" or "No" to the display system 16. After the user presses the button, the display system 16 will receive the first selection command and send the first selection command to the first processing unit 17.

Then, executing Step 606: comparing the first selection command to determine if a first code is used.

The first processing unit 17 compares the first selection command to determine if the user wants to use the first code. If the user does not want to use the first code and presses the "No" button on the display system 16, then the user wants to use the operation mode of the second embodiment, which does not have the code protection function. Therefore, the display system 16 receives the first selection command of "No" and sends it to the first processing unit 17, and the first processing unit 17 confirms that it has received the first selection command of "No"; then Step 201 of the second embodiment and the following steps shown in FIG. 5 will be executed. If the user wants to use the first code and presses the "Yes" button shown on the display system 16, then the user wants to use the operation mode of the third embodiment or the fourth embodiment with the first code protection function. Therefore, the display system 16 receives the first selection command of "Yes" and sends it to the first processing unit 17, and the first processing unit 17 confirms that it has received the first selection command of "Yes". Then the following Step 607 will be executed.

Then, executing Step 607: displaying a second mode menu on the display system.

After the first processing unit 17 receives the first selection command of "Yes", the first processing unit 17 will control the display system 16 to display a second mode menu. The second mode menu asks if the user wants to use the second code and provides buttons for the user to indicate "Yes" and "No". However, the type of the second mode menu is not limited to that design; the form and terms of the second mode menu can be changed according to variable design requirements.

Then, executing Step 608: receiving a second selection command via the display system.

The user can press the button of "Yes" or "No" shown on the display system 16 according to the requirement of the user to give the second selection representing "Yes" or "No" to the display system 16; when the user presses the button, the display system 16 will receive the second selection command and send the second selection command to the first processing unit 17.

Then, executing Step 609: comparing the second selection command to determine if a second code is used.

The first processing unit 17 compares the second selection command to determine if the user wants to use the second code. If the user does not want to use the second code and presses the "No" button on the display system 16, then the user wants to use the operation mode of the third embodiment, which has the first code protection function and does not have the second code protection function. Therefore, the display system 16 receives the second selection command of "No" and sends it to the first processing unit 17, and the first processing unit 17 confirms that it has received the second selection command of "No"; then Step 301 and the following steps of the third embodiment shown in FIG. 6 will be executed. If the user wants to use the second code and presses the button for "Yes" on the display system 16, then the user wants to use the operation mode of the fourth embodiment, which has both the first code and second code protection function. Therefore, the display system 16 receives the second selection command of "Yes" and sends it to the first processing unit 17, and the first processing unit 17 confirms that it has received the second selection command of "Yes". Then Step 401 and the following steps of the fourth embodiment shown in FIG. 8 will be executed.

Via the method of locating peripheral device and the computer program product of the present invention, if the peripheral device paired with the electronic device is misplaced, the user can use the method of locating peripheral device and the computer program product of the present invention to quickly locate the peripheral device. Furthermore, the method of locating peripheral device and the computer program product of the present invention have multiple code protection functions, such as the first code lock, the second code lock and the start code, to prevent others without permission from using the method of locating peripheral device and the computer program product of the present invention.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A method of locating a peripheral device, applied to an electronic device, wherein the electronic device is electronically connected to the peripheral device, the electronic device comprises a locating unit, a first connecting unit, a first transmitter and a display system, and the peripheral device comprises a second connecting unit and a second transmitter, the method of locating the peripheral device comprising:

via the locating unit, obtaining a first location information;

when the first connecting unit is connected to the second connecting unit, sending the first location information to the peripheral device;

after the first connecting unit and the second connecting unit are separated, receiving the first location information sent by the second transmitter via the first transmitter;

via the locating unit, obtaining a second location information; and comparing the first location information and the second location information to determine a relative position of the electronic device and the peripheral device.

2. The method of locating a peripheral device claimed in claim 1, further comprising:
displaying the relative position on the display system.

3. The method of locating a peripheral device claimed in claim 2, further comprising:
receiving a command to display the relative position on the display system.

4. The method of locating a peripheral device claimed in claim 1, further comprising:
receiving a command to stop receiving the first location information; and
controlling the first transmitter to stop receiving the first location information sent by the second transmitter.

5. The method of locating a peripheral device claimed in claim 1, further comprising:
after the first connecting unit and the second connecting unit are separated, receiving a command to send a first location information request.

6. The method of locating a peripheral device claimed in claim 5, wherein the step of receiving the first location information sent by the second transmitter via the first transmitter after the first connecting unit and the second connecting unit are separated further comprises:
via the first transmitter, sending the first location information request to the second transmitter to cause the peripheral device to send back the first location information according to the first location information request.

7. The method of locating a peripheral device claimed in claim 6, further comprising:
receiving a command to stop sending the first location information; and
via the first transmitter, sending a request to stop sending the first location information to the second transmitter to cause the peripheral device to stop sending the first location information according to the request to stop sending the first location information.

8. The method of locating a peripheral device claimed in claim 6, further comprising:
when the first connecting unit is connected to the second connecting unit, setting up a first code lock in the peripheral device, wherein the first code lock can be unlocked via a first code information;
wherein the step of receiving a command to send a first location information request after the first connecting unit and the second connecting unit are separated further comprises: obtaining a first code;
wherein the step of receiving the first location information sent by the second transmitter via the first transmitter after the first connecting unit and the second connecting unit are separated further comprises: via the first transmitter, sending the first code to the second transmitter for the peripheral device to compare the first code and the first code information;
wherein after the peripheral device compares the first code and the first code information, the method of locating peripheral device further comprises:
if the first code matches the first code information, then via the first transmitter, receiving the first location information sent back by the second transmitter, wherein the first code lock for the first location information is unlocked.

9. The method of locating a peripheral device claimed in claim 8, wherein the step of setting up a first code lock in the peripheral device when the first connecting unit is connected to the second connecting unit, wherein the first code lock can be unlocked via a first code information, further comprises:
setting up a second code lock which can be unlocked via a second code information;
wherein the step of receiving the first location information sent by the second transmitter via the first transmitter after the first connecting unit and the second connecting unit are separated further comprises: encrypting the first location information by the second code lock;
wherein the method of locating peripheral device further comprises:
obtaining a second code; and
comparing the second code information and the second code; if the second code information matches the second code, decrypting the first location information which is encrypted by the second code lock.

10. The method of locating a peripheral device claimed in claim 1, further comprising:
displaying a start code inputting interface on the display system, wherein the start code inputting interface is encrypted by a start code information;
receiving a start code via the display system;
comparing the start code information and the start code; if the start code information matches the start code, unlocking the start code inputting interface or displaying a first mode menu on the display system;
if the display system displays the first mode menu, receiving a first selection command via the display system;
comparing the first selection command to determine if a first code is used, if so, displaying a second mode menu on the display system;
receiving a second selection command via the display system; and
comparing the second selection command to determine if a second code is used.

11. The method of locating a peripheral device claimed in claim 1, wherein the step of sending the first location information to the peripheral device when the first connecting unit is connected to the second connecting unit further comprises:
at a specific interval, sending the first location information to the peripheral device.

12. An electronic device, for electrically connecting to a peripheral device, wherein the peripheral device comprises a second connecting unit and a second transmitter, the electronic device comprising:
a locating unit, used for obtaining a first location information and a second location information;
a first connecting unit, used for sending the first location information to the peripheral device when connected to the second connecting unit;
a first transmitter, used for receiving the first location information sent by the second transmitter after the first connecting unit and the second connecting unit are separated;
a first processing unit, electrically connected to the locating unit, the first connecting unit and the first transmitter, wherein the first processing unit is used for comparing the first location information and the second location information to determine the relative position of the electronic device and the peripheral device; and
a display system, electrically connected to the first processing unit, wherein the display system is used for displaying the relative position.

13. The electronic device as claimed in claim 12, wherein the display system is further used for receiving a command; after the display system receives a command to display the relative position on the display system, the display system displays the relative position; after the display system receives a command to stop receiving the first location information, the first processing unit controls the first transmitter to stop receiving the first location information sent by the second transmitter.

14. The electronic device as claimed in claim 12, wherein the display system is further used for receiving a command; after the first connecting unit and the second connecting unit are separated and the display system receives a command to send a first location information request, the first transmitter sends a first location information request to the second transmitter to cause the peripheral device to send back the first location information according to the first location information request.

15. The electronic device as claimed in claim 14, wherein after the display system receives a command to stop sending the first location information, the first transmitter sends a request to stop sending the first location information to the second transmitter to cause the peripheral device to stop sending the first location information according to the request to stop sending the first location information.

16. The electronic device as claimed in claim 14, wherein when the first connecting unit is connected to the second connecting unit, the first processing unit sets up a first code lock in the peripheral device, and the first code lock can be unlocked via a first code information;

after the first connecting unit and the second connecting unit are separated, the display system receives a command to send a first location information request and obtains a first code; after the first connecting unit and the second connecting unit are separated and the first transmitter receives the first location information sent by the second transmitter, the first transmitter sends the first code to the second transmitter for the peripheral device to compare the first code and the first code information;

if the first code matches the first code information, the first transmitter will receive the first location information sent back by the second transmitter, wherein the first code lock for the first location information is unlocked.

17. The electronic device as claimed in claim 16, wherein when the first connecting unit is connected to the second connecting unit and the first processing unit sets up a first code lock in the peripheral device, the first processing unit also sets up a second code lock that can be unlocked via a second code information, and the first location information is encrypted by the second code lock;

after the display system obtains a second code, the first processing unit compares the second code information and the second code; if the second code information matches the second code, the first location information encrypted by the second code lock will be decrypted.

18. The electronic device as claimed in claim 17, wherein the display system is further used for displaying a start code inputting interface, the start code inputting interface is encrypted by a start code information, and the display system is further used for receiving a start code;

wherein the first processing unit compares the start code information and the start code, and if the start code information matches the start code, the start code inputting interface will be unlocked, or the display system will display a first mode menu and receive a first selection command; when the display system receives the first selection command, the first processing unit compares the first selection command to determine if a first code is used, and if so, the display system will display a second mode menu and receive a second selection command; the first processing unit compares the second selection command to determine if a second code is used.

19. The electronic device as claimed in claim 18, wherein when the first connecting unit is connected to the second connecting unit, the first connecting unit will send the first location information to the peripheral device at a specific interval.

* * * * *